United States Patent [19]

Ogasawara et al.

[11] Patent Number: 4,634,851
[45] Date of Patent: Jan. 6, 1987

[54] CONTROL DEVICE FOR AUTOMATIC FOCUSING

[75] Inventors: Akira Ogasawara, Yokohama; Sakuji Watanabe, Warabi; Nobuhiko Terui, Tokyo; Ken Utagawa, Yokohama; Kunihisa Hoshino, Kawasaki, all of Japan

[73] Assignee: Nippon Kogaku K. K., Tokyo, Japan

[21] Appl. No.: 831,059

[22] Filed: Feb. 19, 1986

Related U.S. Application Data

[63] Continuation of Ser. No. 746,016, Jun. 19, 1985, abandoned, which is a continuation of Ser. No. 432,437, Oct. 4, 1982, abandoned.

[30] Foreign Application Priority Data

Oct. 13, 1981 [JP] Japan ................................. 56-163078

[51] Int. Cl.$^4$ ............................ G01J 1/20; G03B 3/10
[52] U.S. Cl. ..................................... 250/204; 250/201; 354/405; 354/408
[58] Field of Search ........................ 250/204, 201 PF; 354/400-409; 356/1, 4

[56] References Cited

U.S. PATENT DOCUMENTS

| 4,085,320 | 4/1978 | Wilwerding | 250/204 X |
| 4,156,563 | 5/1979 | Kato et al. | 354/405 |
| 4,247,762 | 1/1981 | Wilwerding | 354/405 X |
| 4,467,187 | 8/1984 | Tsunekawa et al. | 250/204 |

Primary Examiner—Edward P. Westin
Attorney, Agent, or Firm—Shapiro and Shapiro

[57] ABSTRACT

A control device for automatic focusing includes a low sharpness discriminating circuit for identifying a minimum contrast required for focus detecting function and a correlation zone discriminating circuit for determining whether an object is in or out of a correlation zone in the vicinity of the in-focus position. Output signals are supplied from the two discriminating circuits to a sequence control circuit for determining whether to continue or discontinue operation of a lens driving apparatus for driving the lens. A control device may further include a low brightness discriminating circuit the output signal of which is supplied to the sequence control circuit to immediately discontinue the operation of the lens driving apparatus when the low brightness discriminating circuit identifies a low brightness of the object, regardless of the results of other discriminations.

15 Claims, 9 Drawing Figures

CONTROL DEVICE FOR AUTOMATIC FOCUSING

This is a continuation application of Ser. No. 746,016 filed June 19, 1985, which is a continuation of Ser. No. 432,437 filed Oct. 4, 1982, both of which are now abandoned.

BACKGROUND OF THE INVENTION

1. Field of the Invention

The present invention relates to an automatic focusing device for a photographing optical system, and more particularly to a control device for an automatic focusing device for forming an optical image of an object on photosensors having a plurality of photoelectric elements and focusing an optical system to the object in response to the output signals from the photosensors.

2. Description of the Prior Art

There are already known various automatic focusing devices in which an optical image of an object is formed on photosensors having a plurality of photoelectric elements and a photographing lens is focused to the object in response to the processed output signals of the photosensors. However, as long as the object image is photoelectrically detected by divided photosensors, any device encounters the same difficulty as in the manual focusing with human eyes for achieving an exact focusing in case the object has a low contrast. Consequently, if the focus position cannot be detected, a lens driving apparatus continuously reciprocates the photographing lens between an infinite focused position and a nearest focused position, thus wasting time and energy of a power source. In order to overcome such defect, it has been proposed to provide a timer circuit interlockingly connected to a main switch of the focusing device and to automatically turn off the lens driving apparatus at a time when a predetermined time passes after such reciprocating movement is made. Such device is, however, still insufficient for avoiding the above-mentioned waste of time and energy. Also in such device, in which the focus detecting operation is automatically terminated at a determined time after the main switch is turned on, even if a condition of contrast is favorable, the operator cannot focus the camera continuously and may therefore lose an optimum moment of shutter releasing, particularly in case of following a moving object. Besides, such device is unsuitable for continuous photographing operation, for example, with a motor driven camera.

As mentioned above, a high contrast of the object is an essential condition for a focusing operation. In other words, a dark object provides only a limited light intensity, so that the photosensors are unable to provide a sufficiently high signal-to-noise ratio in the output signals. Consequently, the focus detecting function is significantly deteriorated to reduce detecting accuracy, and is eventually disabled completely in worst conditions. On the other hand, the focusing operation has to be continued for a certain period depending on the structure of a certain kind of focusing device since the image contrast on the photosensors is high or low respectively when the object is in focus or out of focus. However, for a dark object, the light intensity on the photosensors remains almost constant during the focusing operation, so that the lens driving apparatus should be immediately stopped at the initial period of the focus detecting operation if the photosensors are unable to provide output signals in a sufficiently high signal-to-noise ratio.

SUMMARY OF THE INVENTION

A first object of the present invention is to provide a control device for automatic focusing capable of appropriately identifying the contrast of the object without scanning a photographing lens over the entire range from the infinite focused position to the nearest focused position for focusing and judging whether or not to terminate the focusing operation as promptly as possible to control the driving of lens, thereby avoiding the waste in time and in electric power supply.

A second object of the present invention is to provide a control device for automatic focusing capable of immediately interrupting the focusing operation in case the object is of such a low brightness or so dark that the reliable focus detecting function is made impossible or unstable.

The above-mentioned first object can be achieved according to the present invention by a control device comprising a low sharpness discriminating circuit for identifying a minimum contrast required for the focus detecting function and a correlation zone discriminating circuit for identifying whether the object is positioned in or out of a determined zone, called a correlation zone, around the in-focus position, whereby the output signals from the two discriminating circuits are supplied to a sequence control circuit for determining to continue or discontinue the operation of the lens driving apparatus for driving the lens. Also the above-mentioned second object can be achieved according to the present invention by a control device comprising a low brightness discriminating circuit the output signal of which is supplied to said sequence control circuit to immediately discontinue the operation of said lens drive apparatus when the low brightness discriminating circuit identifies a low brightness of the object, regardless of the results of discrimination by said low sharpness discriminating circuit and said correlation zone discriminating circuit.

DETAILED DESCRIPTION OF THE PREFERRED EMBODIMENTS

Figure 1:
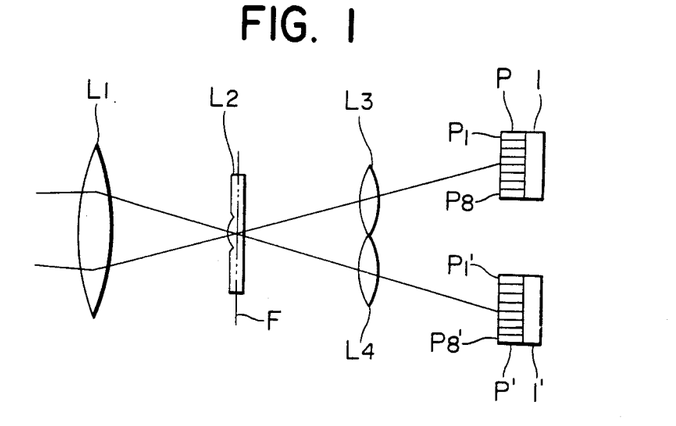
FIG. 1 is a schematic view of an optical system in an embodiment of the present invention.

Now the present invention will be clarified in detail by the following description of preferred embodiments to be taken in conjunction with the attached drawings. The optical system shown in FIG. 1 is similar to that employed in the so-called phase method automatic focusing system as disclosed in the U.S. Pat. No. 4,336,450 of the present applicant, wherein the image of an object to be focused to is formed on a pair of photosensors P, P' each divided into plural elements, through a field lens L2 positioned at a fixed focal plane of an objective lens L1 or an equivalent plane thereof and further through relay lenses L3, L4. In case of a camera, a photographic film F is placed at the focal plane of the objective lens L1, so that the field lens L2 is placed in a subsidiary optical path divided by a light beam dividing mirror or a movable mirror positioned in the optical path of the objective lens L1. The light receiving surfaces of the photosensors P, P' are positioned in places which are conjugate with the fixed focal plane of the objective lens L1, with respect to the relay lenses L3, L4, respectively. In the illustrated embodiment, each photosensor P or P' is composed of eight photoelectric elements. The relay lenses L3, L4 and photosensors P, P' are disposed in such a manner that, when the objective lens L1 is focused against the object, no relative displacement is produced between the object image formed on the photosensor P and that on the photosensor P'. Consequently in such case corresponding elements of the photosensors P, P', for example P1 and P1', P8 and P8', receive an equal incident light intensity. On the other hand, in so-called front-focused state in which the object image formed by the objective lens L1 is positioned in front of the fixed focal plane, i.e. between the lens L1 and the field lens L2 in FIG. 1, the image on the photosensor P moves downwards while that on the photosensor P' moves upwards. Also in the so-called back-focused state in which the object image formed by the objective lens L1 is positioned behind the fixed focal plane, i.e. between the field lens L2 and the relay lenses L3, L4 in FIG. 1, the images on the photosensors P, P' move respectively in opposite directions to those in the above front-focused state. Now reference is made to FIG. 2. Photoelectric outputs from the photoelectric elements P1-P8, P1'-P8' of the photosensors P, P' are supplied, after amplification by head amplifiers 1, 1', respectively to Fourier component extracting circuits 2, 2' for extracting determined spatial frequency components from the divided images formed on the divided elements P1-P8, P1'-P8'0 of the photosensors P, P' according to the states of the divisions. A phase comparator 3 compares a phase of a determined spatial frequency component $Ae^{j(\omega t+\phi_1)}$ obtained from the photoelectric output of the photosensor P through the Fourier component extracting circuit 2 with a phase of another determined spatial frequency component $Be^{j(\omega t+\phi_2)}$ obtained from the photoelectric output of the photosensor P' through the Fourier component extracting circuit 2', and supplies a sequence control circuit 4 with a signal representing whether the objective lens is in the front-focused position, the back-focused position or the in-focus position (in-phase condition). In the above-described notations of the spatial frequency components, A and B represent the amplitudes of the Fourier components while $\phi_1$ and $\phi_2$ represent the relative phases of the Fourier components in the optical images based on a spatial frequency of photodiode array. In response to the output signal from the phase comparator 3, the sequence control circuit 4 controls a driving circuit 5 for driving a motor M in order to move the objective lens L1 or a part thereof along an optical axis, thus performing the automatic focusing operation. Also the phase comparator 3 is so constructed that it supplies lighting signal circuits with its output signal to light a light-emitting diode LED1 or LED2 respectively in case of a front-focused or a back-focused state, or to light both light-emitting diodes in case of the in-focus state. Another light-emitting diode LED3 is provided for an alarm as will be explained later.

The automatic focusing operation by the above-described series of focus detecting circuits relies on the sufficient brightness and contrast of the object, required for the automatic focusing, and will be disabled or eventually become unreliable because of an unstable servo control function in case the sequence control circuit 4 contains a servo control circuit, if the brightness or contrast is low. For the purpose of clarity, the words "low brightness" and "low sharpness" shall be hereinafter used in the following meanings.

"Low brightness" state means a state in which the photosensor is unable to provide an output signal with a sufficiently high signal-to-noise ratio because of a deficient light intensity from the object, or, because the object is dark. On the other hand, "Low sharpness" state means a state in which the output signals of the photosensors have little difference because of a low contrast of the object, so that the result of subsequent signal processing is not reliable. A similar phenomenon occurs, though rather rarely, when the period of periodic light-and-dark pattern of the object coincides with the period or its multiples of the photosensors, and such phenomenon is also included in this state.

Figure 2:
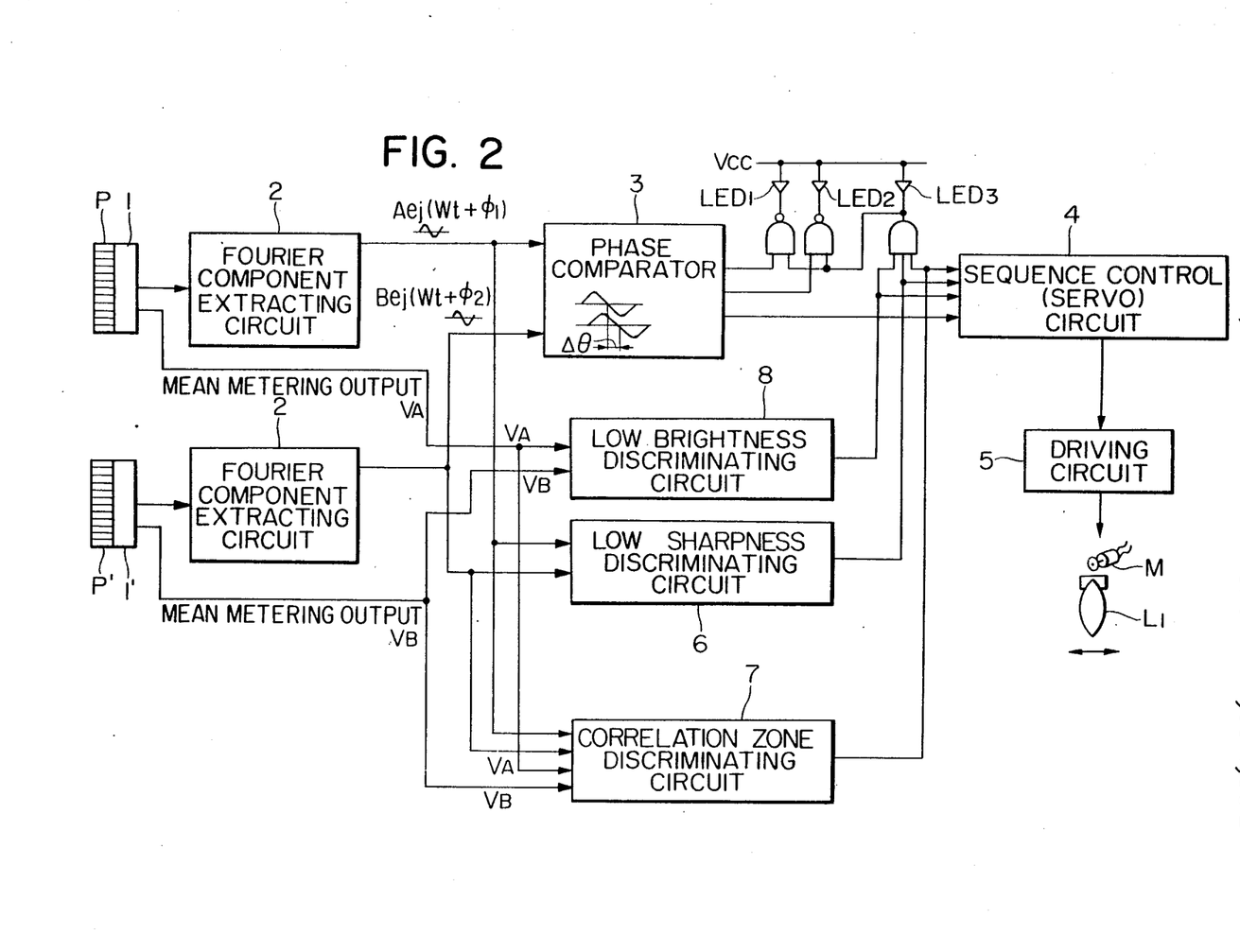
FIG. 2 is a block diagram of a signal processing system of the embodiment.
Figure 3:
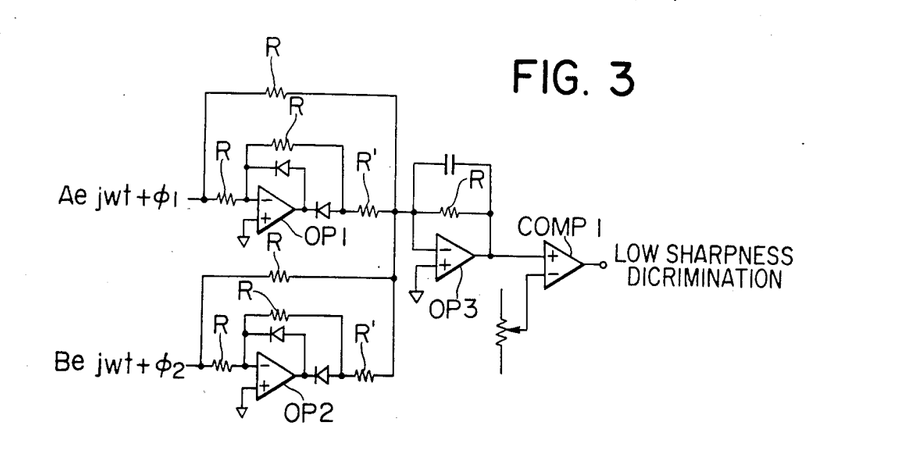
FIG. 3 is a circuit diagram of a low sharpness discriminating circuit.

Again referring to FIG. 2, the aforementioned Fourier component extracting circuits 2, 2' supply the output signals $Ae^{j(\omega t+\phi_1)}$ and $Be^{j(\omega t+\phi_2)}$ to a low sharpness discriminating circuit 6 and a correlation zone discriminating circuit 7 to be explained later, respectively. Also the photoelectric output signals of the elements P1-P8 of the photosensor P and those of the elements P1'-P8' are respectively collected by the head amplifiers 1, 1' to provide means metering outputs VA, VB to the correlation zone discriminating circuit 7 and a low brightness discriminating circuit 8 to be explained later, respectively. FIG. 3 shows the low sharpness discriminating circuit 6, in which an absolute value synthesizing circuit composed of operational amplifiers OP1, OP2, OP3 and resistors R, R' rectifies and synthesizes the above-mentioned output signals $Ae^{j(\omega t+\phi_1)}$, $Be^{j(\omega t+\phi_2)}$ of the Fourier component extracting circuits 2, 2' to obtain a sum of absolute values $|Ae^{j(\omega t+\phi_1)}| + |Be^{j(\omega t+\phi_2)}|$, and then a comparator Comp1 identifies a low sharpness state by comparing said sum with a suitable predetermined threshold value and supplies the resulting discrimination signal to the sequence control circuit. The amplitude of the Fourier component is interpreted as a factor representing the sharpness. Thus, in case of a low amplitude, the aforementioned rectified output becomes also low, providing a low-level output signal from the comparator Comp1. The resistance of the resistor R' is selected as half of that of the resistor R.

Figure 4:
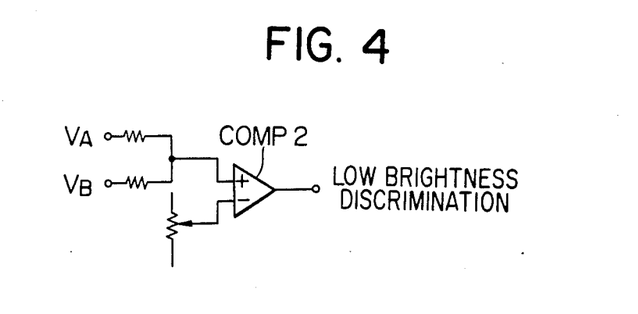
FIG. 4 is a circuit diagram of a low brightness discriminating circuit.

FIG. 4 shows the low brightness discriminating circuit 8, which identifies the low-brightness state by comparing the average value of the mean metering output signals VA, VB from the photosensors P, P' with a predetermined threshold value in a comparator Comp2. The mean metering output signals are assumed to have higher voltages at a higher brightness, and it is assumed that a low-level discrimination signal is supplied to the sequence control circuit in response to a low brightness state.

Figure 5A:
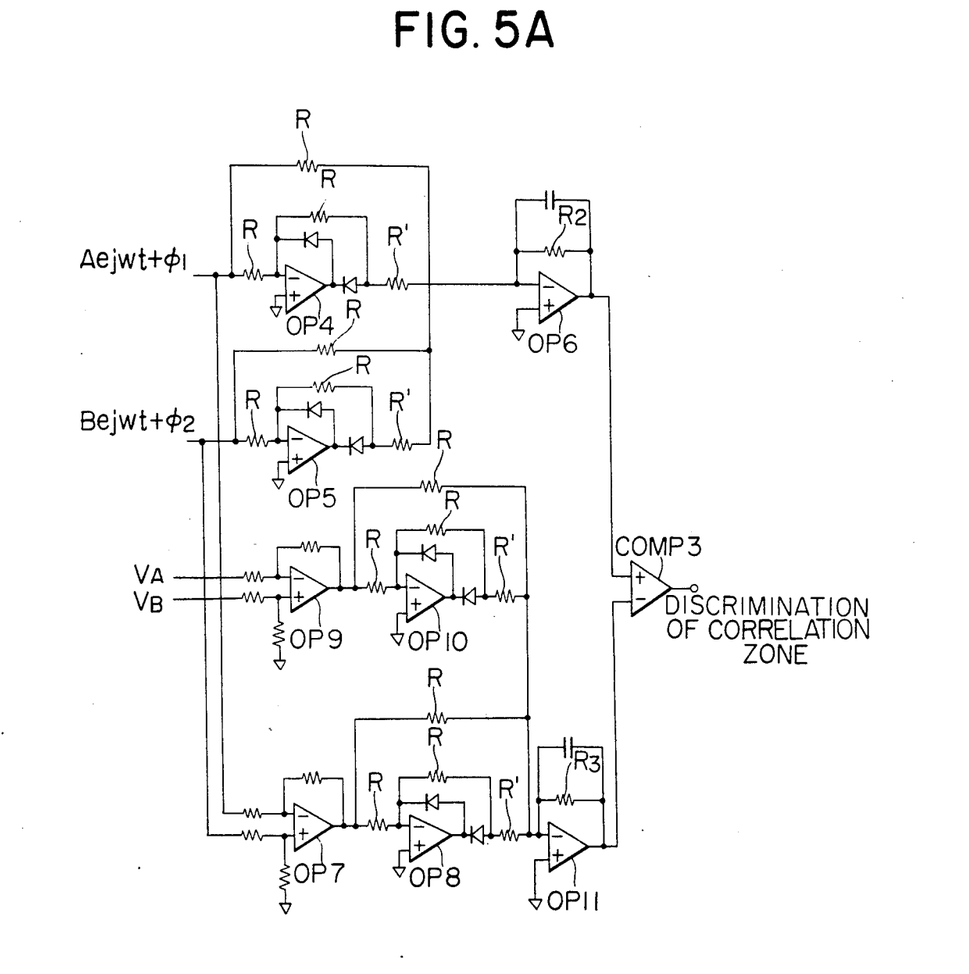
FIG. 5A is a circuit diagram of a correlation zone discriminating circuit.

FIG. 5A shows the correlation zone discriminating circuit 7 composed of a comparator Comp3, operational amplifiers OP4-OP11 and resistors R, R' R2, R3 and adapted for identifying whether the object is within a correlation zone around the in-focus position. The circuit is utilized for preliminary rough automatic focusing before the focusing operation by the phase comparator 3. The function for the correlation zone discrimination is given by:

$$f = \frac{|Ae^{j(\omega t+\phi_1)} - Be^{j(\omega t+\phi_2)}| + |VA - VB|}{|Ae^{j(\omega t+\phi_1)}| + |Be^{j(\omega t+\phi_2)}|}$$

wherein $Ae^{j(\omega t+\phi_1)}$ and $Be^{j(\omega t+\phi_2)}$ are the Fourier components corresponding to the photosensors P, P', and VA and VB are the mean metering output signals thereof. At the in-focus state:

$$Ae^{j(\omega t+\phi_1)} = Be^{j(\omega t+\phi_2)}$$

$$VA = VB$$

$$(A = B, \phi_1 = \phi_2)$$

so that the numerator is zero. The denominator changes as the lens moves away from the in-focus position. In order to follow this change, let us consider the following function for the purpose of simplicity:

$$\frac{|Ae^{j(\omega t+\phi_1)} - Be^{j(\omega t+\phi_2)}|}{|Ae^{j(\omega t+\phi_1)}| + |Be^{j(\omega t+\phi_2)}|}$$

Figure 5B:
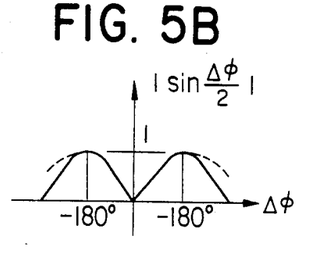
FIGS. 5B and 5C are charts showing correlation functions of the correlation zone discriminating circuit.
Figure 5C:
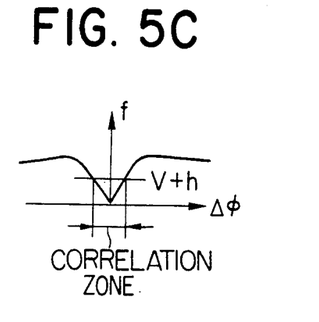

The images on the photosensors P, P' are approximately equal at least in the vicinity of the in-focus position, so that A can be considered approximately equal to B. Consequently the above-mentioned function can be rewritten as:

$$\frac{|e^{j(\omega t+\phi_1)} - e^{j(\omega t+\phi_2)}|}{|e^{j(\omega t+\phi_1)}| + |e^{j(\omega t+\phi_2)}|} = \left|\sin\frac{\phi_1 - \phi_2}{2}\right|$$

as represented by a solid line in FIG. 5B in which $|\sin\{(\phi_1-\phi_2)/2\}|$ is plotted in the ordinate as a function of $\Delta\phi=\phi_1-\phi_2$ in the abscissa. The actual function assumes the form of the dotted lines, however, since A becomes different from B as the lens moves away from the in-focus position because of the image movements on the photosensors P, P'. Now in consideration of the quantity $|VA-VB|$ representing the difference of the mean metering output signals of the photosensors P, P', the correlation function f assumes a form represented by a solid line in FIG. 5C. For the purpose of the above-described correlation zone discrimination, the circuit shown in FIG. 5A separately calculates the denominator $|Ae^{j(\omega t+\phi_1)}| + |Be^{j(\omega t+\phi_2)}|$ and the numerator $|Ae^{j(\omega t+\phi_1)}-Be^{j(\omega t+\phi_2)}|+|VA-VB|$. The operational amplifiers OP4, OP5, OP6 calculate the sum of the absolute values of the Fourier components to obtain said denominator. On the other hand, the operational amplifier OP7 calculates the difference of input signals $Ae^{j(\omega t+\phi_1)}$ and $Be^{j(\omega t+\phi_2)}$, the operational amplifier OP8 calculates the absolute value of said difference, the operational amplifier OP9 calculates the difference of the input signal VA and VB and the operational amplifier OP10 calculates the absolute value of said difference. Consequently, the above-mentioned numerator is obtained from the sum of the output signals of the amplifiers OP8 and OP10. In the above-described circuit, the correlation zone discrimination is achieved by comparing the output signals from the operational amplifiers OP6 and OP11 by the comparator Comp3, instead of determining the correlation function by dividing said numerator by the denominator. However, in order to achieve a proper correspondence with the threshold value Vth of the correlation zone shown in FIG. 5C, the gains of the circuits for calculating said numerator and denominator are suitably adjusted by the resistors R2 and R3. In case the value of correlation function is smaller than said threshold value, namely within the correlation zone shown in FIG. 5C, a high-level discrimination signal is supplied to the sequence control circuit.

Now there will be given an explanation on the function of the embodiment shown in FIG. 2, particularly that of the sequence control circuit 4. The phase method automatic focusing system disclosed in the U.S. Pat. No. 4,336,450 mentioned before relies on the basic principle of phase method automatic focusing to extract predetermined Fourier components from the object images formed on two photosensors respectively divided into plural elements in relation to the manner of said division, and to identify the front-focused or back-focused state from the phase difference of said Fourier components, but said system is featured by an improved precision in focus detection through a fact that a correlation signal is generated to identify if the object is positioned in the vicinity of the in-focus position, and that the focus detection is achieved by phase difference if the object is within a predetermined range, or a correlation zone, around the infocus position. In such system, however, if the object is not bright enough or not sharp enough, it becomes necessary to inform the operator that the object is not suitable for photographing and to automatically control the lens driving apparatus according to the state of the object. For this reason, according to the present invention, the sequence control circuit 4 is provided for the following purposes:

(1) to supply a signal to the driving circuit 5 to immediately terminate the lens driving regardless of the discrimination by other discriminating circuits when the low brightness discriminating circuit 8 identifies the "low brightness" state;

(2) to continue the focusing operation in case the low brightness discriminating circuit 8 identifies the absence of "low brightness" state and the correlation zone discriminating circuit 7 identifies a state "outside the correlation zone" thereby scanning the entire focusing range to look for the correlation zone, and, in case the correlation zone is not found in said entire focusing range, to instruct the driving circuit 5 to stop the lens at the infinite focused position and to await a resetting:

(3) in case the correlation zone discriminating circuit 7 identifies a state inside "correlation zone", (a) to instruct the driving circuit 5 to immediately stop the lens if the low sharpness discriminating circuit 6 identifies the "low sharpness" state, or (b) to control the driving circuit 5 according to the phase difference signal from the phase comparator 3 if said low sharpness discriminating circuit 6 identifies the absence of "low sharpness" state, thus stopping the lens when the phase difference becomes zero: and (4) to continue the focusing operation as in the preceding paragraph (3) in case the low sharpness discriminating circuit 6 identifies the "low sharpness" state but the correlation zone discriminating circuit 7 simultaneously identifies a state outside the "correlation zone" thereby looking for the correlation zone, and, if said correlation zone is not found, to instruct the driving circuit 5 to stop the lens at the infinite focused position and to await a resetting.

If said sequence control circuit is provided with a servo control circuit, a stable focusing can be achieved by controlling the moving speed of the lens according to the amount of phase difference found in the phase comparator 3, thus reducing said speed as the lens approaches the infocus position. The sequence control circuit repeats the above-explained procedure when the operator resets the control device. The low brightness discriminating circuit 8 and the low sharpness discriminating circuit 6 constantly monitor the brightness and sharpness of the object, and an alarm is given by the light-emitting diode LED3 in case of the "low brightness" state, "low sharpness" state or the state outside the "correlation zone".

Figure 6:
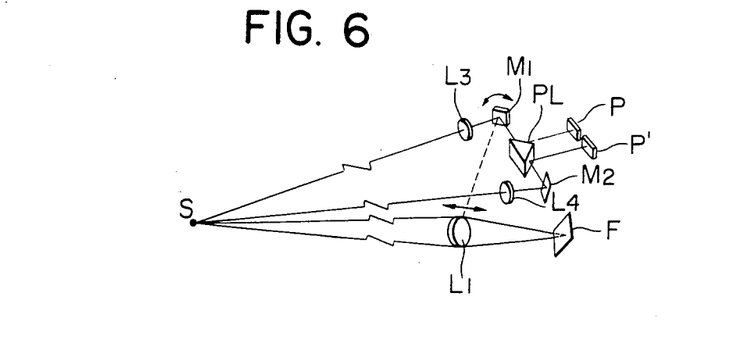
FIGS. 6 and 7 are schematic views showing other arrangements of optical system than that shown in FIG. 1.
Figure 7:
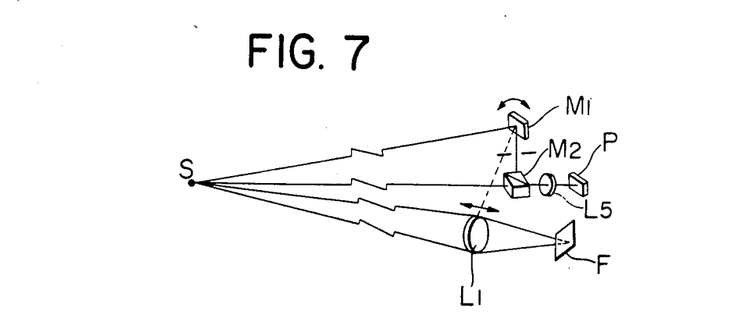

The embodiment shown in FIG. 1 is applied to a so-called TTL metering camera in which the photosensors P, P' measure the light passing through the objective lens L1, but the present invention is also applicable to an automatic focusing system as shown in FIG. 6, in which image forming lenses L3, L4 are provided on a metering optical paths completely separate from the photographing optical system including the objective lens L1 and photographic film F. In such case the images of an object S are formed on the photosensors P, P' through mirrors M1, M2 and a prism PL, and said mirror M1 is rendered rotatable to displace the object image on the photosensor P and is linked with the objective lens L1 in such a manner that said lens L1 focuses the object image on the photographic film F when the image on the photosensor P coincides with that on the photosensor P'. The present invention is applicable to such automatic focusing system, since it is capable of electrically comparing two object images. In an arrangement shown in FIG. 7, the light coming through the rotatable mirror M1 and the light coming directly from the object S are transmitted through a half-reflecting prism M2 and are directed toward a photosensor P through an image forming lens L5. At first, the light from the mirror M1 is intercepted to form the object image on the photosensor P with divided elements by the light passing through said prism M2, and the obtained output signals are stored in a memory. Then superposed double images are formed on the photosensor P by the light coming through the mirrors M1, M2. The distance is determined by the angular position of the mirror M1 when the output signals of the photosensor P corresponding to said double images coincide with those stored in the memory, and the objective lens L1 is moved corresponding to said distance. The present invention is also applicable to such case, since the focusing is achieved through the comparison of two photoelectric output signals although there is employed only one photosensor.

The present invention is furthermore applicable to a known system in which the mirror M1 shown in FIG. 6 is fixed and the photosensors P, P' are composed of charge-coupled devices, whereby the scanning operation is electrically effected and the distance is determined from the time-sequential electric output signals. In case the photosensor is a charge-accumulating device, such as the charge-coupled device, which is usually controlled to prolong the charge accumulating time in case of a low brightness state, it is desirable to determine a limit in the charge accumulating time and to generate an alarm signal for the low-brightness state by the light-emitting diode LED3 in case the output signal from the photosensor does not reach a sufficient level within the limited charge accumulating time.

In the foregoing embodiments the amplitude representing the object sharpness is obtained by an absolute value circuit since the Fourier component extracting circuits 2, 2' provide said component in the form of an analog sinusoidal signal, but digital processing with a microcomputer for the entire system is applicable if said component is dividedly given in the form of X and Y components.

As explained in the foregoing, the present invention allows, through the use of relatively simple discriminating circuits and a sequence control circuit, not only to promptly identify an object not suitable for automatic focusing and to discontinue the lens driving, thereby avoiding waste in time and electric power, but also to improve the accuracy of automatic focusing. Also with the use of an alarm device and of a simple additional procedure, it is rendered possible to obtain appropriate alarms corresponding to the situation of photographing.

Although the present invention has been explained by embodiments in which the focus detecting circuit utilizes a phase method, the present invention is by no means limited to such application.

We claim:

1. Focus adjusting apparatus for a camera in which an image of an object to be photographed is formed on a predetermined plane through a phototaking lens comprising:
    (a) position detecting means for detecting an amount of and a direction of deviation of said object image with respect to said predetermined plane and generating a position detection signal indicating the detected amount and direction of the deviation;
    (b) driving means for driving said phototaking lens in such a manner as to form said object image on said predetermined plane in accordance with said position detection signal;
    (c) position discriminating means adapted for discriminating that said object image is positioned within a vicinity range around said predetermined plane and accordingly generating a position discrimination signal;
    (d) contrast discriminating means adapted for discriminating that the contrast of said object is below a predetermined level and accordingly generating a contrast discrimination signal; and
    (e) means for impeding said driving means from driving said phototaking lens in response to generation of both said position discriminating signal and said contrast discrimination signal but permitting said driving when only said position discrimination signal is generated.

2. An apparatus according to claim 1, wherein said position detection means comprise first and second photosensor arrays, each having a plurality of linearly arranged photoelectric conversion elements, each of the first and second photosensor arrays having a light receiving surface for receiving light from said object through said phototaking lens and generating photoelectric outputs corresponding to light intensity distribution at the light receiving surface,
    said position detection means including a first extracting means for extracting at least one spatial frequency component from the photoelectric outputs of the first photosensor array and a second extracting means for extracting at least one spatial frequency component from the photoelectric outputs from the second photosensor array.

3. An apparatus according to claim 2, wherein said apparatus further includes first metering means for metering an average light intensity on the light receiving surface of the first photosensor array and generating an output signal and second metering means for metering an average light intensity on the light receiving surface of the second photosensor array and generating an output signal, said position discriminating means detecting that said object image is within a vicinity of said predetermined plane in accordance with output signals of the first and second extracting means.

4. An apparatus according to claim 1, wherein said position detecting means has means for detecting the intensity distribution of light from said object through said phototaking lens and producing a light intensity distribution signal, the detecting of deviation and the generating of a position detection signal by said position detecting means depending upon said light intensity distribution, the discriminating by said contrast discriminating means also depending upon said light intensity distribution signal.

5. An apparatus according to claim 4, wherein said position discriminating means includes means for producing a correlation signal dependent upon said light intensity distribution signal, and means dependent upon said correlation signal for discriminating that said object image is positioned within said vicinity range.

6. An apparatus according to claim 5, wherein said means dependent upon said correlation signal compares a correlation value determined from said correlation signal with a predetermined value.

7. An apparatus according to claim 1, wherein said means for impeding said driving means impedes said driving means from driving said phototaking lens when said driving means has driven said phototaking lens throughout a focusing range of said lens and said position discrimination signal has not been generated, said impeding means permitting said driving means to drive said phototaking lens throughout said focusing range regardless of the generation of said contrast discrimination signal when said position discrimination signal is not generated.

8. Focus adjusting apparatus for a camera in which an image of an object to be photographed is formed on a predetermined plane through a phototaking lens comprising:
   (a) position detecting means for detecting an amount of and a direction of deviation of said object image with respect to said predetermined plane and generating a position detection signal indicating the detected amount and direction of the deviation;
   (b) driving means for driving said phototaking lens in such a manner as to form said object image on said predetermined plane in accordance with said position detection signal;
   (c) position discriminating means adapted for discriminating that said object image is positioned within a vicinity range around said predetermined plane and accordingly generating a position discrimination signal;
   (d) contrast discriminating means adapted for discriminating that the contrast of said object is below a predetermined level and accordingly generating a contrast discrimination signal;
   (e) brightness discriminating means adapted for discriminating that the brightness of said object is below a predetermined level and accordingly generating a brightness discrimination signal; and
   (f) means for impeding said driving means from driving said phototaking lens in response to both said position discrimination signal and said contrast discrimination signal being generated but permitting said driving when only said position discrimination signal is generated, said impeding means impeding said driving means from driving said phototaking lens in response to generation of said brightness discrimination signal independently of the generation of said position discrimination signal and said contrast discrimination signal.

9. An apparatus according to claim 8, wherein said position detection means comprise first and second photosensor arrays, each having a plurality of linearly arranged photoelectric conversion elements, each of the first and second photosensor arrays having a light receiving surface for receiving light from said object through said phototaking lens and generating photoelectric outputs corresponding to light intensity distribution at the light receiving surface, said position detection means including a first extracting means for extracting at least one spatial frequency component from the photoelectric outputs of the first photosensor array and a second extracting means for extracting at least one spatial frequency components from the photoelectric outputs from the second photosensor array.

10. An apparatus according to claim 9, wherein said apparatus further includes first metering means for metering an average light intensity on the light receiving surface of the first photosensor array and generating an output signal and second metering means for metering an average light intensity on the light receiving surface of the second photosensor array and generating an output signal, said position discriminating means detecting that said object image is within a vicinity of said predetermined plane in accordance with output signals of the first and second metering means and the first and second extracting means.

11. An apparatus according to claim 10, wherein said brightness discriminating means detects that the brightness of the object is lower than a predetermined level in accordance with output signals of the first and second metering means.

12. An apparatus according to claim 8, wherein said position detecting means has means for detecting the intensity distribution of light from said object through said phototaking lens and producing a light intensity distribution signal, the detecting of deviation and the generating of a position detection signal by said position detecting means depending upon said light intensity distribution, the discriminating by said contrast discriminating means also depending upon said light intensity distribution signal.

13. An apparatus according to claim 12, wherein said position discriminating means includes means for producing a correlation signal dependent upon said light intensity distribution signal, and means dependent upon said correlation signal for discriminating that said object image is positioned within said vicinity range.

14. An apparatus according to claim 13, wherein said means dependent upon said correlation signal compares a correlation value determined from said correlation signal with a predetermined value.

15. An apparatus according to claim 8, wherein said means for impeding said driving means impedes said driving means from driving said phototaking lens when said driving means has driven said phototaking lens throughout a focusing range of said lens and said position discrimination signal has not been generated, said impeding means permitting said driving means to drive said phototaking lens throughout said focusing range regardless of the generation of said contrast discrimination signal when said position discrimination signal is not generated.

* * * * *